(12) United States Patent
Mehta

(10) Patent No.: US 12,079,349 B2
(45) Date of Patent: Sep. 3, 2024

(54) SYSTEM AND METHOD OF ACCESS CONTROL OF ONE OR MORE SERIAL PORTS OF AN INFORMATION HANDLING SYSTEM

(71) Applicant: Dell Products L.P., Round Rock, TX (US)

(72) Inventor: Siddhant Mehta, Ujjain (IN)

(73) Assignee: Dell Products L.P., Round Rock, TX (US)

( * ) Notice: Subject to any disclaimer, the term of this patent is extended or adjusted under 35 U.S.C. 154(b) by 238 days.

(21) Appl. No.: 17/813,142

(22) Filed: Jul. 18, 2022

(65) Prior Publication Data

US 2024/0020393 A1    Jan. 18, 2024

(51) Int. Cl.
*G06F 21/60* (2013.01)
*G06F 21/32* (2013.01)
*G06F 21/85* (2013.01)

(52) U.S. Cl.
CPC .......... *G06F 21/602* (2013.01); *G06F 21/32* (2013.01); *G06F 21/85* (2013.01)

(58) Field of Classification Search
CPC ......... G06F 21/602; G06F 21/32; G06F 21/85
See application file for complete search history.

(56) References Cited

U.S. PATENT DOCUMENTS

| | | | | |
|---|---|---|---|---|
| 8,856,918 B1 * | 10/2014 | Efstathopoulos | ....... | G06F 21/44 726/19 |
| 2012/0159646 A1 * | 6/2012 | Hong Chi | ............... | G06F 21/78 726/28 |
| 2014/0325642 A1 * | 10/2014 | Lee | ..................... | H04L 63/0876 726/19 |

FOREIGN PATENT DOCUMENTS

WO    WO-2022239004 A1 * 11/2022 .......... G06F 11/1456

* cited by examiner

*Primary Examiner* — Vu V Tran
(74) *Attorney, Agent, or Firm* — McDermott Will & Emery LLP

(57) ABSTRACT

In one or more embodiments, one or more systems, one or more methods, and/or one or more processes may: prohibit data communications, via a serial communication port of an information handling system, with an operating system executing on the information handling system; determine that a serial communication cable has been connected to the serial communication port; receive, via the serial communication port, first biometric data associated with a user from an integrated circuit of the serial communication cable; retrieve encrypted information associated with the user from a nonvolatile memory medium; decrypt the encrypted information associated with the user to determine second biometric data; determine that the first biometric data matches the second biometric data; and in response to determining that the first biometric data matches the second biometric data, permit the data communications via the serial communication port.

20 Claims, 9 Drawing Sheets

SYSTEM AND METHOD OF ACCESS CONTROL OF ONE OR MORE SERIAL PORTS OF AN INFORMATION HANDLING SYSTEM

BACKGROUND

Field of the Disclosure

This disclosure relates generally to information handling systems and more particularly to access control of one or more serial ports of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may prohibit data communications, via a serial communication port of an information handling system, with an operating system executing on the information handling system; may determine that a serial communication cable has been connected to the serial communication port; may receive, via the serial communication port, first biometric data associated with a user from an integrated circuit of the serial communication cable; may retrieve encrypted information associated with the user from a nonvolatile memory medium; may decrypt the encrypted information associated with the user to determine second biometric data; may determine that the first biometric data matches the second biometric data; and in response to determining that the first biometric data matches the second biometric data, may permit the data communications via the serial communication port.

In one or more embodiments, the one or more systems, the one or more methods, and/or the one or more processes may further, in response to determining that the first biometric data matches the second biometric data, provide command information to the integrated circuit of the serial communication cable indicating to permit the data communications via the serial communication cable. In one or more embodiments, determining that the serial communication cable has been connected to the serial communication port may include receiving a hot plug event that indicates that the serial communication cable has been connected to the serial communication port. In one or more embodiments, the serial communication port is configured to be compliant with at least one of a universal serial bus (USB) specification, a Thunderbolt specification, a SATA (Serial Advanced Technology Attachment) specification, and a SAS (Serial Attached SCSI) specification.

In one or more embodiments, the first biometric data includes first fingerprint data associated with the user, and the second biometric data includes second fingerprint data associated with the user. In one example, the first fingerprint data includes a fingerprint template associated with the user. In another example, the second fingerprint data includes a plurality of fingerprint features associated with a fingerprint of the user. In one or more embodiments, determining that the first biometric data matches the second biometric data may include determining numerical match score based at least on the fingerprint template and the plurality of fingerprint features and determining that the numerical match score meets or exceeds a numerical threshold.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
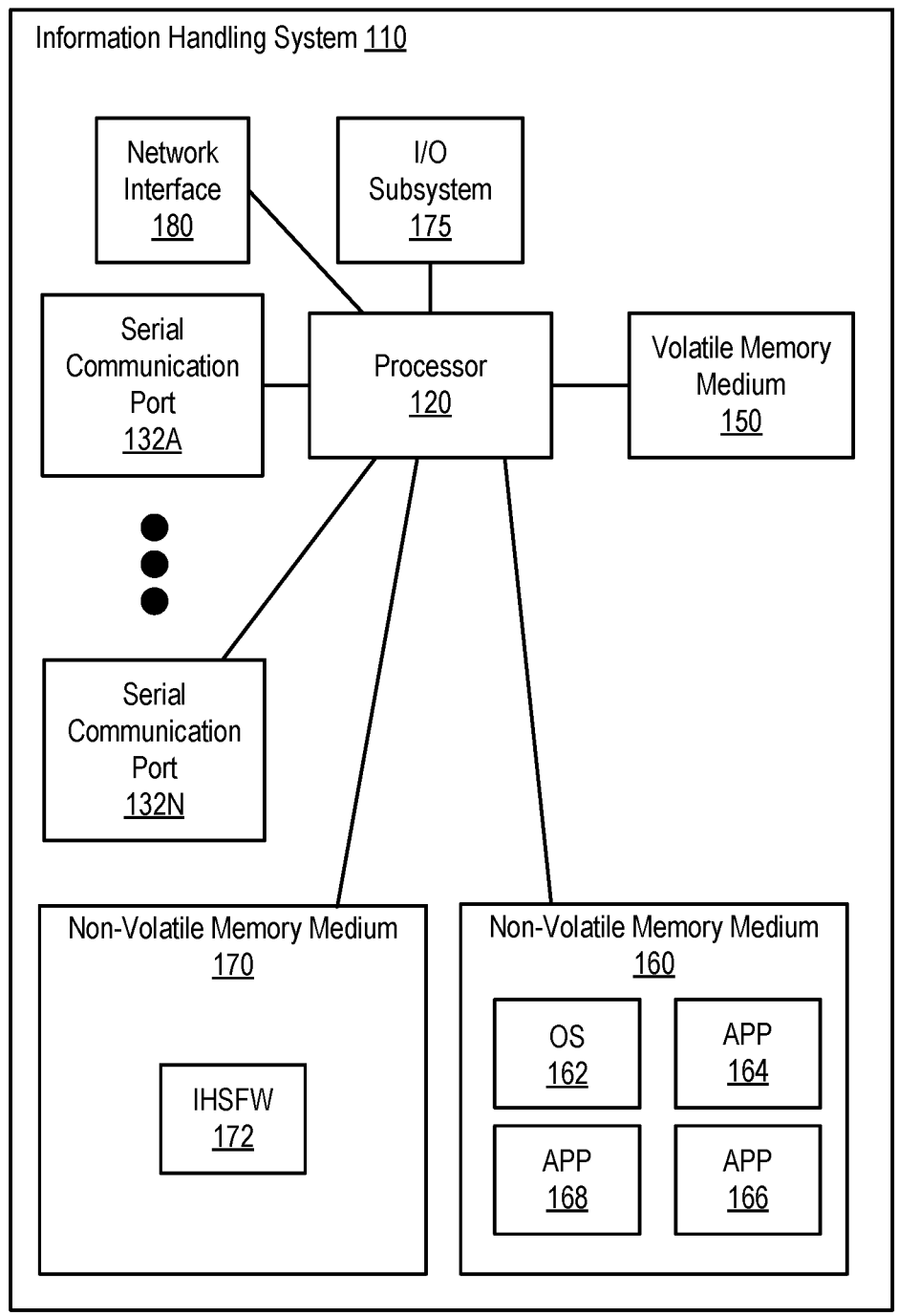
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may utilize a serial communication port for input/output (I/O). For example, the serial communication port may be compliant with one or more of a universal serial bus (USB) specification, a Thunderbolt specification, a SATA (Serial Advanced Technology Attachment) specification, and a SAS (Serial Attached SCSI (Small Computer System Interface)) specification, among others. In one or more embodiments, the information handling system may utilize access control of the serial communication port for I/O. For example, the information handling system may authenticate one or more of a user, a device, and a serial communication cable, among others, before permitting data to be received from and/or provided to the serial communication port. For instance, the serial communication cable may be compliant with one or more of a USB specification, a Thunderbolt specification, a SATA specification, and a SAS specification, among others. In one or more embodiments, a serial communication cable may include an integrated circuit (IC). For example, the information handling system may utilize the IC of the serial communication cable in authenticating the one or more of the user, the device, and the serial communication cable, among others, before permitting data to be received from and/or provided to the serial communication port. For instance, the IC may provide a security layer to an existing "plug-and-play" feature of serial port communication, which may provide additional security from malicious user attacks.

In one or more embodiments, the IC may receive biometric data associated with a user. In one example, the IC may include and/or may be communicatively coupled to a fingerprint reader, which may receive the biometric data associated with the user. For instance, the serial communication cable may include the fingerprint reader. In another example, the IC may include and/or may be communicatively coupled to a fingerprint scanner, which may receive the biometric data associated with the user. For instance, the serial communication cable may include the fingerprint scanner. In another example, the IC may include and/or may be communicatively coupled to a retina scanner, which may receive the biometric data associated with the user. For instance, the serial communication cable may include the retina scanner. In one or more embodiments, the information handling system may authenticate the one or more of the user, the device, and the serial communication cable, among others, based at least on the biometric data associated with the user. In one example, after the information handling system authenticates the one or more of the user, the device, and the serial communication cable, among others, based at least on the biometric data associated with the user, the information handling system may communicate data via the serial communication port. In another example, if the information handling system does not authenticate the one or more of the user, the device, and the serial communication cable, among others, based at least on the biometric data associated with the user, the information handling system may not communicate data via serial communication port. In one instance, not communicating data via serial communication port may prevent unauthorized access of the information handling system. In another instance, not communicating data via the serial communication port may prevent a "person-in-the-middle" attack. As an example, a "person-in-the-middle" attack may corrupt, spoof, and/or alter data exchanged between a device and the information handling system.

In one or more embodiments, the IC may be added and/or integrated into a USB male connector of the serial communication cable, which may determine, based at least on metadata or control information from the information handling system, to query the user for authentication or permit the user use the serial communication port directly. For example, a light emitter (e.g., a light emitting diode (LED), an incandescent bulb, an electrical filament, etc.) may be added and/or integrated into the USB male connector, which may alert the user that the IC is expecting a fingerprint scan. In one instance, the light emitter may flash when the IC is powered on or is reset. In another example, the light emitter may not emit light when the serial communication port may be utilized.

In one or more embodiments, the information handling system may receive the metadata from the IC. For example, a device driver executing on the information handling system may receive the metadata, which may identify one or more of the IC and the serial cable, among others. For instance, the device driver may perform different actions based at least on the metadata. In one or more embodiments, the IC may receive data from the information handling system. For example, the data from the information handling system may indicate if a secure serial port feature is enabled. In one or more embodiments, the information handling system may execute processor instructions that may aid in performing create/retrieve/update/delete (CRUD) operations based at least on the biometric data associated with the user.

In one or more embodiments, an information handling system firmware device driver, executable by a processor of the information handling system, may enable or disable a secure communication feature on the serial communication port. For example, the information handling system firmware device driver may be executed via a hot plug event when a cable connector is plugged into the serial communication port. For instance, the information handling system firmware device driver may expect to receive the biometric data associated with the user. In one or more embodiments, secure communication feature on one or more serial communications ports on the information handling system available to the user may be disabled by default. For example, the secure communication feature on all serial communications ports on the information handling system may be disabled by default. In one or more embodiments, multiple users may be registered for redundancy purposes. For example, any number of users may be registered. For instance, multiple users may be administrators of the information handling system.

In one or more embodiments, to utilize biometric data to provide access to the serial port of the information handling system, the user may register his or her biometric data. For example, to utilize the biometric data to provide access to the serial port of an information handling system, the user may register his or her fingerprint data. For instance, the user or an administrator may enable a secure serial communication feature on the serial communication port of the information handling system from information handling system firmware or an application and then may plug in a serial communications cable. For example, the serial communications cable may be coupled to a peripheral device.

In one or more embodiments, the biometric data associated with the user may be stored by the information handling system via an encrypted form via a file. For example, the file may be transferred to one or more other information handling systems after registration is completed. In one or more embodiments, the file may be transferred to the one or more other information handling systems utilizing an automation process. For example, the automation process may include an Ansible Playbook. For example, the Ansible Playbooks may provide a repeatable, reusable, configuration management and multi-information handling system deployment system. For example, the Ansible Playbooks may deploy applications, data, and/or files to the one or more information handling systems. In one or more embodiments, the biometric data associated with the user may enabled or disabled on multiple information handling systems via an automation process. For example, the automation process may include an Ansible Playbook.

In one or more embodiments, when a user utilizes a serial communication port of an information handling system, the user may open an application from a baseboard management controller or a remote desktop for information handling systems. For example, from a console or a management session for information handling systems, the user may select a registration mode to begin a registration process. For instance, the registration process may acquire biometric data associated with the user. As an example, acquiring biometric data associated with the user may include scanning one or more fingerprints of the user.

In one or more embodiments, the biometric data associated with the user may be encrypted. In one example, encrypting the biometric data associated with the user may include utilizing an asymmetric encryption process. For instance, the asymmetric encryption process may utilize a private encryption key and a public encryption key, which may be derived from the private encryption key. In another example, encrypting the biometric data associated with the user may include utilizing a symmetric encryption process. In one or more embodiments, encrypting the biometric data associated with the user may secure the biometric data associated with the user. In one example, security of the biometric data associated with the user may provide access control of the biometric data associated with the user. In another example, security of the biometric data associated with the user may provide authentication of the biometric data associated with the user. For instance, encrypted biometric data associated with the user may aid in indicating and/or determining any tampering with the biometric data associated with the user. In one or more embodiments, encrypted biometric data associated with the user may be stored via a file. For example, the file that includes the encrypted biometric data associated with the user may be provided to one or more information handling systems. For instance, the file that includes the encrypted biometric data associated with the user may be provided to one or more information handling systems via a network. As an example, the one or more information handling systems may be communicatively coupled to the network.

In one or more embodiments, when a serial communication cable is connected to a serial communication port of an information handling system, the serial communication port may provide information to the serial communication cable. For example, the serial communication port may provide information to an IC of the serial communication cable. In one or more embodiments, the information provided to the serial communication cable may include data, which may indicate that a secure communication feature is enabled or disabled. For example, indicating that the secure communication feature is enabled may include providing authentication information to the serial communication cable. In one or more embodiments, the authentication information may include one or more of a nonce (i.e., a random or semi-random number that is generated for a specific use) and a hash value (e.g., a hash value of data that includes the nonce), among others. In one example, the serial communication cable may acquire biometric information from a user after the serial communication cable authenticates the authentication information from the information handling system and/or the serial communication port of the information handling system. In a second example, the serial communication cable may not acquire biometric information from a user if the serial communication cable cannot authenticate the authentication information from the information handling system and/or the serial communication port of the information handling system. In another example, the serial communication cable with an IC may provide authentication information to the information handling system and/or the serial communication port of the information handling system. In one instance, the information handling system and/or the serial communication port of the information handling system may determine that a serial communication cable is a secure serial communication cable after the authentication information from the serial communication cable is authenticated. In another instance, the information handling system and/or the serial communication port of the information handling system may not receive authentication information from the serial communication cable. As an example, if the information handling system and/or the serial communication port of the information handling system does not receive authentication information from the serial communication cable or if the information handling system and/or the serial communication port of the information handling system does not or cannot authenticate the authentication information from the serial communication cable, the information handling system and/or the serial communication port of the information handling system may determine that the serial communication cable is not a secure serial communication cable. For instance, if the serial communication cable is not a secure serial communication cable, the information handling system and/or the serial communication port of the information handling system may not permit a device (e.g., a peripheral device) connected to the serial communication cable to be utilized with the information handling system and/or the serial communication port of the information handling system. In one or more embodiments, if the secure communication feature is enabled, the IC of the serial communication cable may acquire biometric data associated with a user. For example, if the secure communication feature is enabled, the IC of the serial communication cable may acquire fingerprint data associated with the user. For instance, the serial communication cable may include a fingerprint scanner communicatively coupled to the IC of the serial communication cable.

In one or more embodiments, after the user is authenticated, the fingerprint scanner and/or a light emitter may be deactivated, and a communicative connection to the serial communication cable may be activated, which may permit the user to utilize the serial communication port of the information handling system, the serial communication cable, and/or a peripheral device communicatively coupled to the serial communication cable. In one or more embodiments, the IC of the serial communication cable may permit communications between the information handling system and the peripheral device without utilizing the fingerprint scanner if the information provided to the serial communication cable indicates that a secure communication feature is not enabled. In one or more embodiments, the IC of the serial communication cable may permit communications between the information handling system and the peripheral device without utilizing the fingerprint scanner if the information from the information handling system is not provided to the serial communication cable or the IC of the serial cable. In one or more embodiments, the IC of the serial communication cable may permit communications between the information handling system and the peripheral device without utilizing the fingerprint scanner if the information from the information handling system, provided to the serial communication cable, indicates that secure communication feature is disabled.

In one or more embodiments, information handling system firmware of the information handling system may wait for biometric data associated with a user. For example, a device driver of the information handling system may wait for the biometric data associated with the user. For instance, the biometric data associated with the user may include fingerprint data associated with the user. In one or more embodiments, the information handling system firmware may determine if the biometric data associated with the user matches biometric data associated with the user from a file. If the biometric data associated with the user matches the biometric data associated with the user from the file, the serial communication port of the information handling system and/or the serial communication cable may be utilized to communicate data between the information handling system and the peripheral device.

If the biometric data associated with the user does not match the biometric data associated with the user from the file, information may be communicated to the user, and the serial communication port of the information handling system and/or the serial communication cable may not be utilized to communicate data between the information handling system and the peripheral device. In one or more embodiments, communicating the information to the user may include a light emitter of the serial communication cable may emit light. In one example, the light emitter of the serial communication cable may blink a pattern. For instance, the pattern may indicate a status to the user. In another example, the light emitter of the serial communication cable may emit red light. For instance, a color of light may indicate a status to the user. In one or more embodiments, the information communicated to the user may indicate that the user should proceed with another attempt to authenticate the user.

In one or more embodiments, if a serial communication cable does not include an IC that is configured to communicate with the information handling system firmware of the information handling system, the information handling system firmware may not permit communications via a serial communication port coupled to the serial communication cable. For example, if the serial communication cable does not include the IC that is configured to communicate with the information handling system firmware, a device driver of the information handling system firmware may not permit communications via the serial communication port coupled to the serial communication cable. For instance, not permitting communications via the serial communication port coupled to the serial communication cable may secure the information handling system from one or more malicious attacks via the serial communication port. In one or more embodiments, if a secure serial communication feature on the serial communication port of the information handling system is enabled and a serial communication cable, coupled to the serial communication port, does not include an IC that is configured to communicate with the information handling system firmware of the information handling system, the information handling system firmware may not permit communications via the serial communication port coupled to the serial communication cable. For example, if a secure serial communication feature on the serial communication port of the information handling system is enabled and a serial communication cable, coupled to the serial communication port, does not include an IC that is configured to communicate with the information handling system firmware of the information handling system, the information handling system firmware may not permit communications to a peripheral device coupled to the serial communication cable.

In one or more embodiments, if the information handling system firmware does include instructions to secure a serial communication port coupled to the serial communication cable, which includes the IC, the serial communication cable may permit communications between the serial communication port coupled to the serial communication cable and a peripheral device coupled to the serial communication cable. For example, the serial communication cable may behave as if the serial communication cable did not include the IC. For instance, the light emitter of the serial communication cable may be disabled.

In one or more embodiments, an administrator (e.g., a person) may enter information associated with one or more users whose biometric data are registered and/or may view logs to examine, study, and/or investigate who has accessed one or more serial communication ports of one or more information handling systems. In one or more embodiments, the administrator may remove and/or prevent access of one or more users to one or more serial communications ports of one or more information handling systems.

In one or more embodiments, at least a portion of one or more systems, at least a portion of one or more flowcharts, at least a portion of one or more methods, and/or at least a portion of one or more processes may secure one or more serial communication ports of an information handling system from a person-in-the-middle attack. For example, a user may not be able to utilize a serial communication port of an information handling system until an authentication process has been successfully completed. In one or more embodiments, at least a portion of one or more systems, at least a portion of one or more flowcharts, at least a portion of one or more methods, and/or at least a portion of one or more processes may block communications of a serial communication port of an information handling system until an authentication process has been successfully completed. For example, the serial communication port may be blocked until the authentication process has been successfully completed. For instance, this may provide hardware level blocking, in which only authorized users can use one or more serial communication ports of an information handling system. In one or more embodiments, at least a portion of one or more systems, at least a portion of one or more flowcharts, at least a portion of one or more methods, and/or at least a portion of one or more processes may provide a secured plug-and-play system for one or more serial communication ports of an information handling system.

In one or more embodiments, information handling system firmware executing on an information handling system may prohibit data communications, via a serial communication port of the information handling system, with an operating system executing on the information handling system. For example, the serial communication port may be configured to be compliant with at least one of a USB specification, a Thunderbolt specification, a SATA specification, and a SAS specification. In one or more embodiments, the information handling system firmware may determine that a serial communication cable has been connected to the serial communication port and may receive, via the serial communication port, first biometric data associated with a user from an integrated circuit of the serial communication cable. In one example, determining that the serial communication cable has been connected to the serial communication port may include receiving a hot plug event that indicates that the serial communication cable has been connected to the serial communication port. In another example, the first biometric data may include first fingerprint data associated with the user. For instance, the first fingerprint data may include a fingerprint template associated with the user.

In one or more embodiments, the information handling system firmware may retrieve encrypted information associated with the user from a memory medium. In one example, the information handling system may include the memory medium. In another example, another information handling system may include the memory medium. For instance, the information handling system may access the memory medium included by the other information handling system, via a network. In one or more embodiments, the information handling system firmware may decrypt the encrypted information associated with the user to determine and/or obtain second biometric data. For example, the second biometric data may include second fingerprint data associated with the user. For instance, the first biometric data may be acquired at a first time, and the second biometric data may be acquired at a second time, different from the first time. As an example the second time may precede the first time. In one or more embodiments, the second fingerprint data may include multiple fingerprint features associated with a fingerprint of the user. For example, determining that the first biometric data matches the second biometric data may include determining numerical match score based at least on the fingerprint template and the multiple of fingerprint features and determining that the numerical match score meets or exceeds a numerical threshold. For instance, if numerical match score meets or exceeds a numerical threshold, a match of the first biometric data to the second biometric data may be indicated and/or determine. In one or more embodiments, the information handling system firmware may determine that the first biometric data matches the second biometric data and, in response to determining that the first biometric data matches the second biometric data, may permit the data communications via the serial communication port.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network switch, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
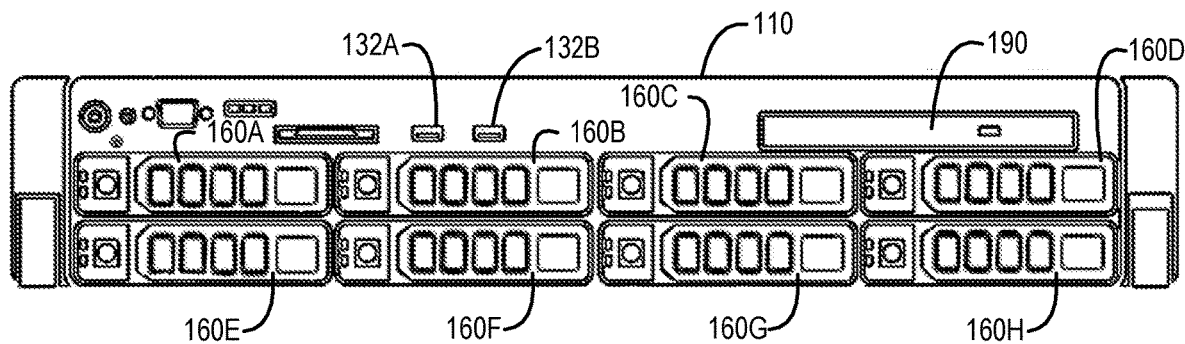
FIG. 1B illustrates an example of a front of an information handling system, according to one or more embodiments.

Turning now to FIG. 1B, an example of a front of an information handling system is illustrated, according to one or more embodiments. In one or more embodiments, a front of IHS 110 may include multiple serial communication ports 132. For example, the front of IHS 110 may include serial communication ports 132A and 132B. In one or more embodiments, non-volatile memory media 160A-160H may be accessible from the front of IHS 110. Although non-volatile memory media 160A-160H are illustrated, IHS 110 may include any number of non-volatile memory media 160, according to one or more embodiments. In one or more embodiments, the front of IHS 110 may include access of an optical drive 190. In one or more embodiments, the front of IHS 110 may include access to other device ports.

Figure 1C:
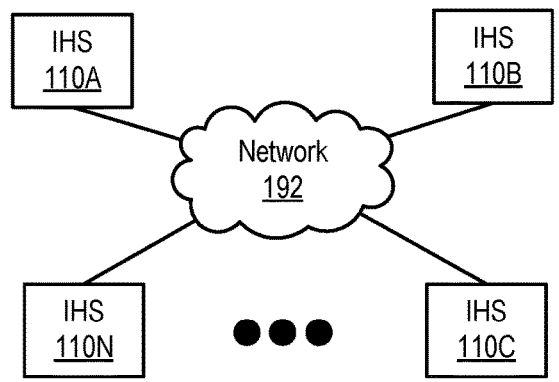
FIG. 1C illustrates an example of information handling systems communicatively coupled to a network, according to one or more embodiments.

Turning now to FIG. 1C, an example of information handling systems communicatively coupled to a network is illustrated, according to one or more embodiments. As illustrated, information handling systems (IHSs) 110A-110N may be coupled to a network 192. In one or more embodiments, network 192 may include a wired network, a wireless network, an optical network, or a combination of the foregoing, among others. For example, network 192 may include and/or be coupled to various types of communications networks. For instance, network 192 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

Figure 2A:
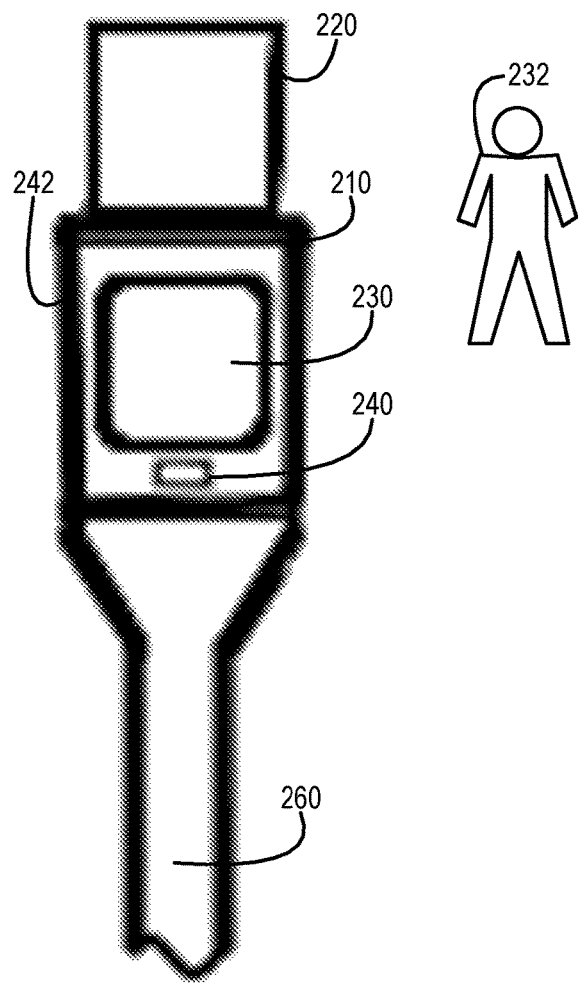
FIGS. 2A and 2B illustrate an example of a secure serial communication cable, according to one or more embodiments.
Figure 2B:
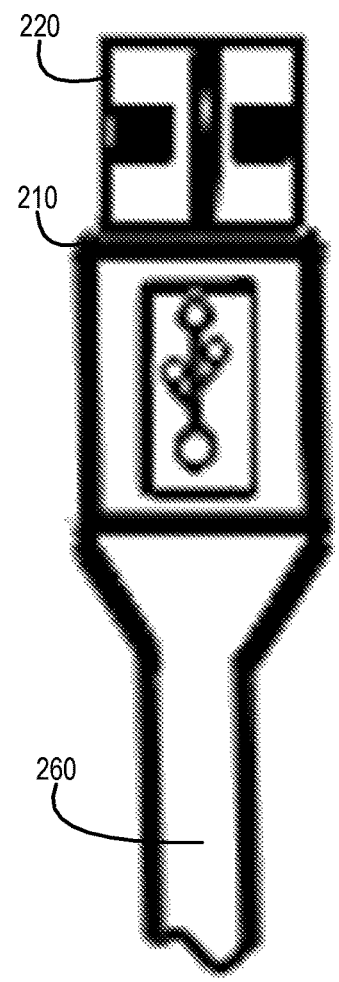

Turning now to FIGS. 2A and 2B, an example of a secure serial communication cable is illustrated, according to one or more embodiments. An example of a top of a secure serial communication cable 210 is illustrated in FIG. 2A. An example of a bottom of secure serial communication cable 210 is shown in FIG. 2B. In one or more embodiments, secure serial communication cable 210 may include a connector 220. For example, connector 220 may be a male serial communication connector. For instance, connector 220 may be a male USB connector. In one or more embodiments, connector 220 may be a USB type "A" connector.

In one or more embodiments, secure serial communication cable 210 may include a biometric data acquisition device or sensor, which may be configured to acquire biometric data from a human. For example, secure serial communication cable 210 may include a scanner 230, which may be configured to acquire biometric data from a user 232. For instance, scanner 230 may be or include a fingerprint scanner, which may be configured to acquire fingerprint data from user 232.

In one or more embodiments, secure serial communication cable 210 may include a light emitter 240. For example, light emitter 240 may include one or more light emitting diodes (LEDs), one or more incandescent bulbs, and/or one or more electrical filaments, among others. In one instance, light emitter 240 may be utilized to indicate a status associated with secure serial communication cable 210.

In one or more embodiments, secure serial communication cable 210 may include a housing 242. For example, housing 242 may house scanner 230 and light emitter 240. In one instance, connector 220 may be mounted in housing 242. In another instance, connector 220 may be mounted to housing 242. In one or more embodiments, secure serial communication cable 210 may include a cable 260. For example, cable 260 may include multiple conductors. For instance, the multiple conductors of cable 260 may be insulated from one-another.

Figure 2C:
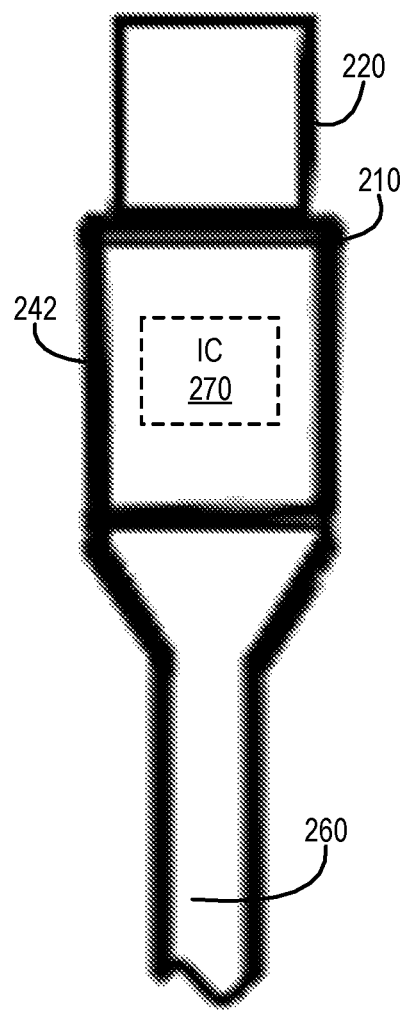
FIG. 2C illustrates an example of a secure serial communication cable that includes an integrated circuit, according to one or more embodiments.

Turning now to FIG. 2C, an example of a secure serial communication cable that includes an integrated circuit is illustrated, according to one or more embodiments. In one or more embodiments, secure serial communication cable 210 may include an IC 270. For example, housing 242 may house IC 270.

Figure 2D:
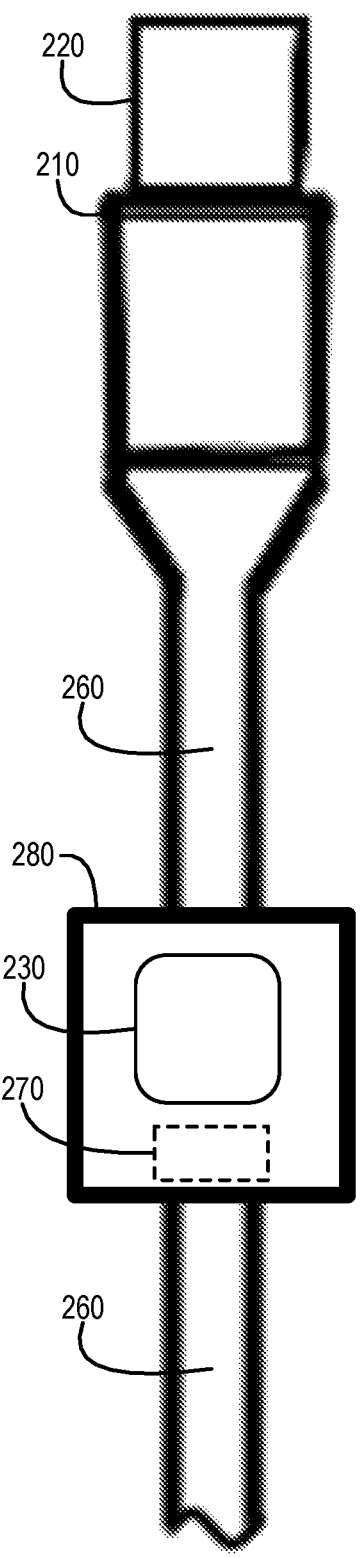
FIG. 2D illustrates an example of a secure serial communication cable that includes a security device, which includes an integrated circuit, according to one or more embodiments.

Turning now to FIG. 2D, an example of a secure serial communication cable that includes a security device, which includes an integrated circuit, is illustrated, according to one or more embodiments. In one or more embodiments, secure serial communication cable 210 may include a security device 280. For example, security device 280 may include scanner 230. For instance, security device 280 may include IC 270. In one or more embodiments, security device 280 may be coupled to cable 260. For example, IC 270 may interpose conductors of cable 260. In one or more embodiments, security device 280 may be mounted to housing 242. For example, security device 280 may house one or more of scanner 230, light emitter 240, and IC 270, among others.

Figure 2E:
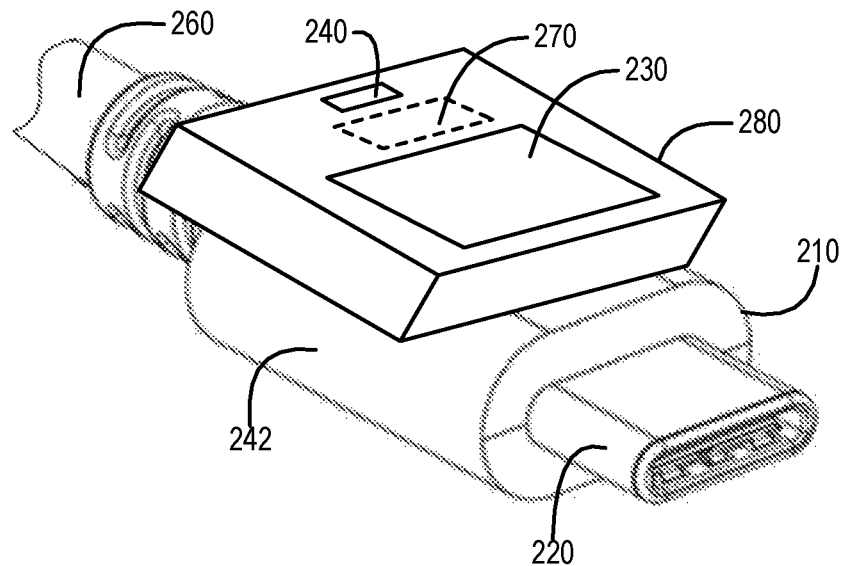
FIG. 2E illustrates another example of a secure serial communication cable, according to one or more embodiments.

Turning now to FIG. 2E, another example of a secure serial communication cable that includes a security device, which includes an integrated circuit, is illustrated, according to one or more embodiments. In one or more embodiments, connector 220 may be a USB type "C" connector. For example, connector 220 may be a male USB connector. In one or more embodiments, secure serial communication cable 210 may include security device 280. For example, security device 280 may include scanner 230. For instance, security device 280 may include IC 270. In one or more embodiments, security device 280 may be mounted to housing 242. For example, security device 280 may house one or more of scanner 230, light emitter 240, and IC 270, among others.

In one or more embodiments, a width of housing 242 may be less than a width of security device 280 or a width of scanner 230, among others. For example, scanner 230 may be associated with a minimum width. For instance, the minimum width associated with scanner 230 may ensure accurate fingerprint scanning. As an example, if scanner 230 has a width less than the minimum width, scanner 230 may not be operable to obtain one or more fingerprints accurately. For instance, security device 280 may be mounted to housing 242 to accommodate the minimum width associated with scanner 230.

Figure 2F:
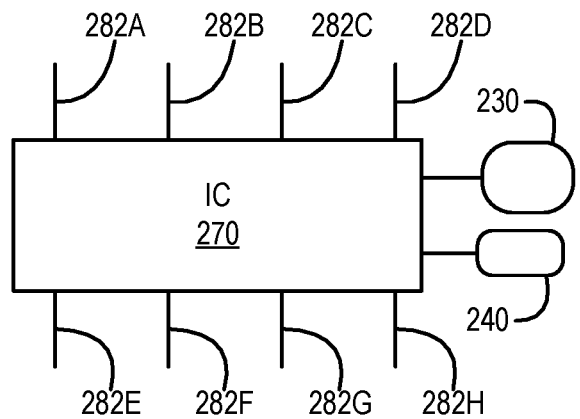
FIG. 2F illustrates an example of an integrated circuit, according to one or more embodiments.

Turning now to FIG. 2F, an example of an integrated circuit is illustrated, according to one or more embodiments. In one or more embodiments, IC 270 may be communicatively coupled to one or more of scanner 230 and light emitter 240. In one or more embodiments, IC 270 may be coupled to conductors 282A-282H. For example, secure serial communication cable 210 may include conductors 282A-282H. In one instance, connector 220 may include conductors 282A-282D. In a second instance, contacts of 220 may be coupled to conductors 282A-282D. In a third instance, housing 242 may include conductors 282A-282D. In a fourth instance, housing 242 may include at least a portion of each of conductors 282A-282D. In a fifth instance, cable 260 may include conductors 282A-282D. In another instance, cable 260 may include conductors 282E-282H. As one example, IC 270 may permit conductor 282A and 282E to be coupled. As a second example, IC 270 may prohibit conductor 282A and 282E from be coupled. As a third example, IC 270 may permit conductor 282B and 282F to be coupled. As a fourth example, IC 270 may prohibit conductor 282B and 282F from be coupled. As a fifth example, IC 270 may permit conductor 282C and 282G to be coupled. As a sixth example, IC 270 may prohibit conductor 282C and 282G from be coupled. As a seventh example, IC 270 may permit conductor 282D and 282H to be coupled. As another example, IC 270 may prohibit conductor 282D and 282H from be coupled.

Although conductors 282A-282H are illustrated, any number of conductors 282 may be utilized, according to one or more embodiments. For example, cable 260 may include any number of conductors 282. For instance, any number of conductors 282 may be coupled to IC 270. As one example, IC 270 may permit any two or more conductors 282 to be coupled. As another example, IC 270 may prohibit any two or more conductors 282 from being coupled.

In one or more embodiments, a secure serial communication cable may include a connector, which may be configured to interface with a serial port of an information handling system, a biometric acquisition device, which may be configured to acquire biometric information associated with a user, a cable, which may be configured to be compliant with a serial protocol, and/or an IC, among others. For example, secure serial communication cable 210 may include a connector 220, which may be configured to interface with a serial port 132 of IHS @10, a scanner 230 (e.g., a biometric acquisition device, which may be configured to acquire biometric information associated with a user 232), a cable 260, which may be configured to be compliant with a serial protocol, and an IC 270, among others.

Figure 3A:
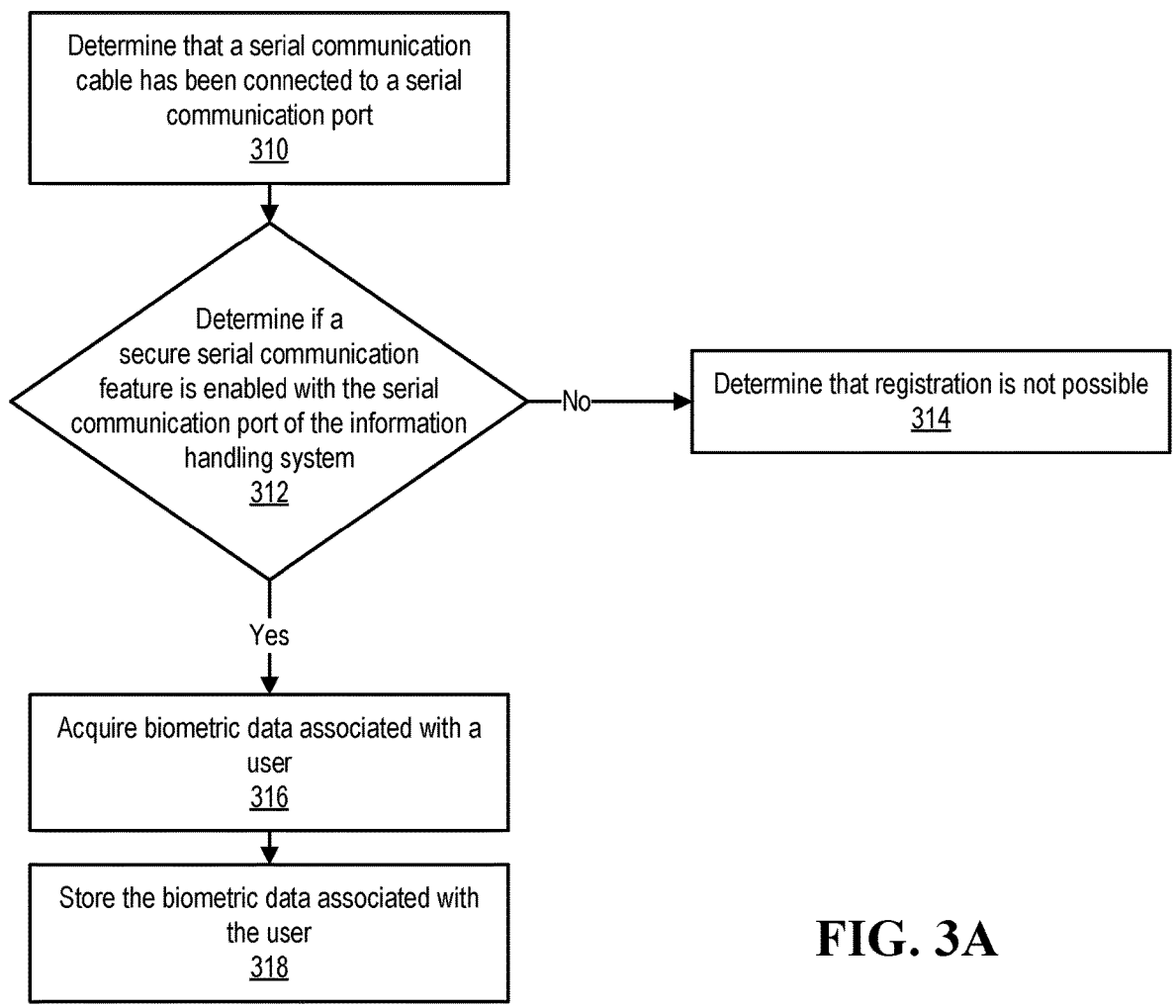
FIG. 3A illustrates an example of a method of registering biometric data associated with a user, according to one or more embodiments.

Turning now to FIG. 3A, an example of a method of registering biometric data associated with a user is illustrated, according to one or more embodiments. At 310, it may be determined that a secure serial communication cable has been connected to a serial communication port of an information handling system. For example, IHS 110 may determine that a secure serial communication cable 210 has been connected to a serial communication port 132 of IS 110. For instance, IHSFW 172 may determine that a secure serial communication cable 210 has been connected to a serial communication port 132 of IS 110.

At 312, it may be determined if a secure serial communication feature is enabled with the serial communication port of the information handling system. For example, IHS 110 may determine if a secure serial communication feature is enabled with serial communication port 132 of IHS 110. For instance, IHSFW 172 may determine if a secure serial communication feature is enabled with serial communication port 132 of IHS 110. If the secure serial communication feature is not enabled with the serial communication port of the information handling system, it may be determined that registration is not possible, at 314. For example, IHS 110 may determine that registration is not possible. For instance, IHSFW 172 may determine that registration is not possible. If the secure serial communication feature is enabled with the serial communication port of the information handling system, biometric data associated with a user may be acquired, at 316. For example, IHS 110 may acquire biometric data associated with user 232. For instance, IHSFW 172 may acquire biometric data associated with user 232. In one or more embodiments, the biometric data associated with the user may include fingerprint data associated with the user. In one example, IHS 110 may acquire fingerprint data associated with user 232. For instance, IHS 110 may scan multiple fingerprints associated with user 232 via scanner 230. In another example, IHSFW 172 may acquire fingerprint data associated with user 232. For instance, IHSFW 172 may scan multiple fingerprints associated with user 232 via scanner 230.

At 318, the biometric data associated with the user may be stored. For example, IHS 110 may store the biometric data associated with the user. For instance, IHSFW 172 may store the biometric data associated with the user. In one or more embodiments, the biometric data associated with the user may be stored in a memory medium. In one example, IHS 110 may store the biometric data associated with the user in a memory medium of IHS 110. In one instance, IHS 110 may store the biometric data associated with the user in memory medium 160. In another instance, IHS 110 may store the biometric data associated with user 232 in memory medium 170. In a second example, IHS 110 may store the biometric data associated with user 232 in a memory medium of another information handling system. For instance, IHS 110 may store the biometric data associated with user 232 in a memory medium of another information handling system via a network. As an example, IHS 110 and the other information handling system may be communicatively coupled to the network. For instance, IHS 110 may provide the biometric data associated with user 232 to the other information handling system via the network.

In a third example, IHSFW 172 may store the biometric data associated with the user in a memory medium of IHS 110. In one instance, IHSFW 172 may store the biometric data associated with the user in memory medium 160. In another instance, IHSFW 172 may store the biometric data associated with user 232 in memory medium 170. In another example, IHSFW 172 may store the biometric data associated with user 232 in a memory medium of another information handling system. For instance, IHSFW 172 may store the biometric data associated with user 232 in a memory medium of another information handling system via a network. As an example, IHSFW 172 and the other information handling system may be communicatively coupled to the network. For instance, IHSFW 172 may provide the biometric data associated with user 232 to the other information handling system via the network.

Figure 3B:
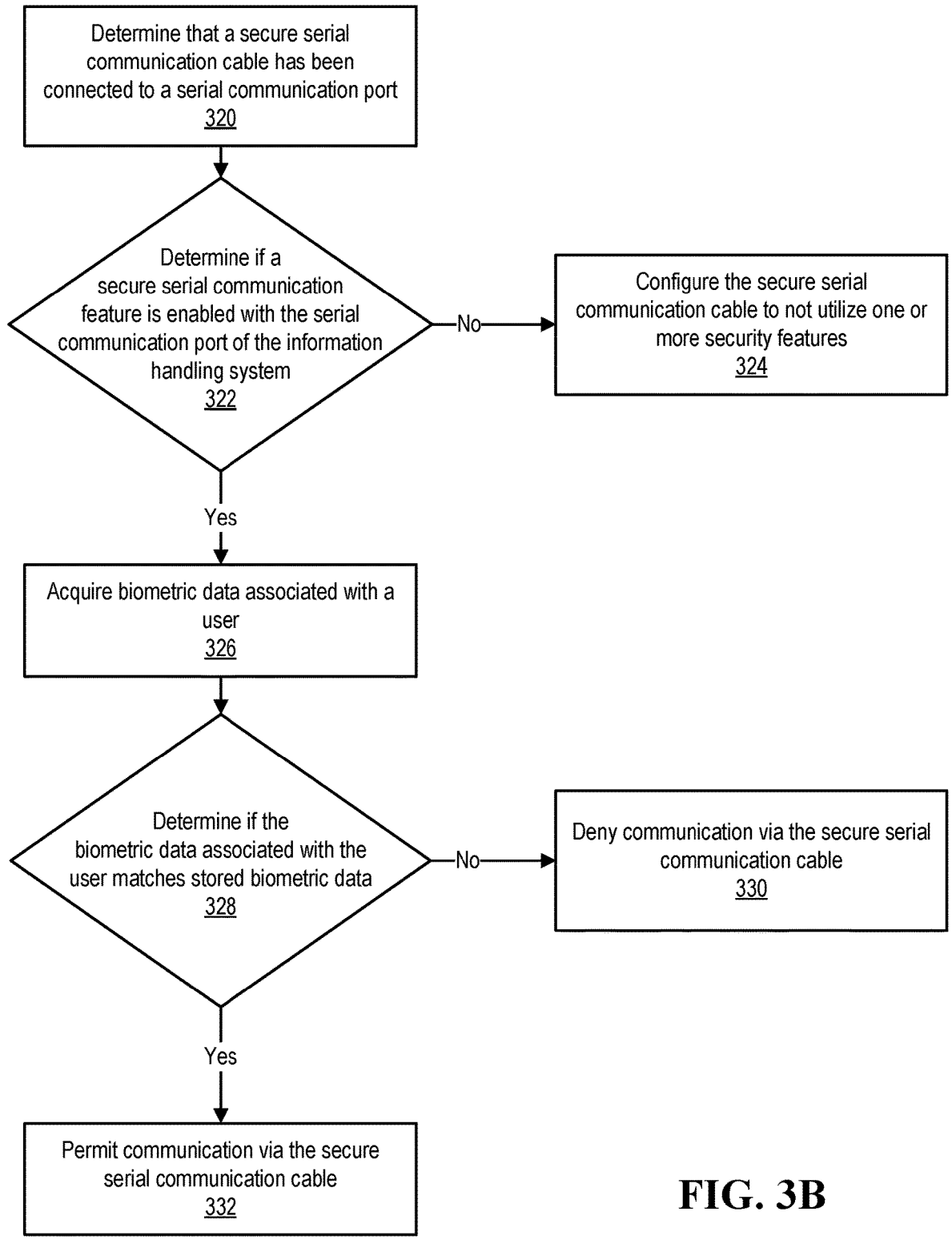
FIG. 3B illustrates an example of a method of providing access control of one or more serial ports of an information handling system, according to one or more embodiments.

Turning now to FIG. 3B, an example of a method of providing access control of one or more serial ports of an information handling system is illustrated, according to one or more embodiments. At 320, it may be determined that a secure serial communication cable has been connected to a serial communication port. For example, IHS 110 may determine that a secure serial communication cable 210 has been connected to a serial communication port 132 of IHS 110. For instance, IHSFW 172 may determine that a secure serial communication cable 210 has been connected to a serial communication port 132 of IHS 110.

At 322, it may be determined if a secure serial communication feature is enabled with the serial communication port of the information handling system. In one example, IHS 110 may determine if a secure serial communication feature is enabled with serial communication port 132 of IHS 110. In a second example, IHSFW 172 may determine if a secure serial communication feature is enabled with serial communication port 132 of IHS 110. In another example, secure serial communication cable 210 may determine if a secure serial communication feature is enabled with serial communication port 132 of IHS 110.

If the secure serial communication feature is not enabled with the serial communication port of the information handling system, the secure serial communication cable may be configured to not utilize one or more security features, at 324. In one example, IHS 110 may configure secure serial communication cable 210 to not utilize one or more security features. In a second example, IHSFW 172 may configure secure serial communication cable 210 to not utilize one or more security features. In another example, IC 270 may configure secure serial communication cable 210 to not utilize one or more security features. For instance, IC 270 may configure secure serial communication cable 210 as a "regular" serial communication cable. As an example, IC 270 may configure secure serial communication cable 210 to operate without one or more security features. For instance, IC 270 may configure secure serial communication cable 210 to operate without any security features.

If the secure serial communication feature is enabled with the serial communication port of the information handling system, biometric data associated with a user may be acquired, at 326. In one example, IHS 110 may acquire biometric data associated with user 232. For instance, IHS 110 may acquire biometric data associated with user 232 via secure serial communication cable 210. In a second example, IHSFW 172 may acquire biometric data associated with user 232. For instance, IHSFW 172 may acquire biometric data associated with user 232 via secure serial communication cable 210. In another example, secure serial communication cable 210 may acquire biometric data associated with user 232. In one instance, secure serial communication cable 210 may acquire biometric data associated with user 232 via scanner 230. In another instance, IC 270 may acquire biometric data associated with user 232 via scanner 230.

In one or more embodiments, secure serial communication cable 210 may provide the biometric data associated with user 232. For example, IC 270 may provide the biometric data associated with user 232. In one or more embodiments, IHS 110 may receive the biometric data associated with user 232 from secure serial communication cable 210. For example, IHS 110 may receive the biometric data associated with user 232 from IC 270. For instance, IHS 110 may receive the biometric data associated with user 232 via one or more of connector 220 and serial communication port 132. In one or more embodiments, IHSFW 172 may receive the biometric data associated with user 232 from secure serial communication cable 210. For example, IHSFW 172 may receive the biometric data associated with user 232 from IC 270. For instance, IHSFW 172 may receive the biometric data associated with user 232 via one or more of connector 220 and serial communication port 132.

At 328, it may be determined if the biometric data associated with the user matches stored biometric data. In one example, IHS 110 may determine if the biometric data associated with user 232 matches stored biometric data. In one instance, IHS 110 may store the stored biometric data. In another instance, another information handling system may store the stored biometric data. As an example, IHS 110 may access the stored biometric data via a network. In another example, IHSFW 172 may determine if the biometric data associated with user 232 matches stored biometric data. In one instance, IHSFW 172 may store the stored biometric data. In another instance, another information handling system may store the stored biometric data. As an example, IHSFW 172 may access the stored biometric data via a network. In one or more embodiments, IHS 110 may provide the biometric data associated with user 232 to the other information handling system via the network. For example, the other information handling system may determine if the biometric data associated with user 232 matches stored biometric data. In one or more embodiments, IHSFW 172 may provide the biometric data associated with user 232 to the other information handling system via the network. For example, the other information handling system may determine if the biometric data associated with user 232 matches stored biometric data.

If the biometric data associated with the user does not match stored biometric data, communications via the secure serial communication cable may be denied, at 330. In one example, IHS 110 may deny communications via secure serial communication cable 210. For instance, IHS 110 may deny communications via serial communication port 132. In a second example, IHSFW 172 may deny communications via secure serial communication cable 210. For instance, IHSFW 172 may deny communications via serial communication port 132. In another example, secure serial communication cable 210 may deny communications via secure serial communication cable 210. For instance, IC 270 may deny communications via secure serial communication cable 210.

If the biometric data associated with the user does matches stored biometric data, communications via the secure serial communication cable may be permitted, at 332. In one example, IHS 110 may permit communications via secure serial communication cable 210. For instance, IHS 110 may permit communications via serial communication port 132. In a second example, IHSFW 172 may permit communications via secure serial communication cable 210. For instance, IHSFW 172 may permit communications via serial communication port 132. In another example, secure serial communication cable 210 may permit communications via secure serial communication cable 210. For instance, IC 270 may permit communications via secure serial communication cable 210. In one or more embodiments, IC 270 permitting communications via secure serial communication cable 210 may include configuring secure serial communication cable 210 to operate as if secure serial communication cable 210 does not have any security features. For example, IC 270 permitting communications via secure serial communication cable 210 may include configuring secure serial communication cable 210 to operate as a "regular" serial communication cable.

Figure 3C:
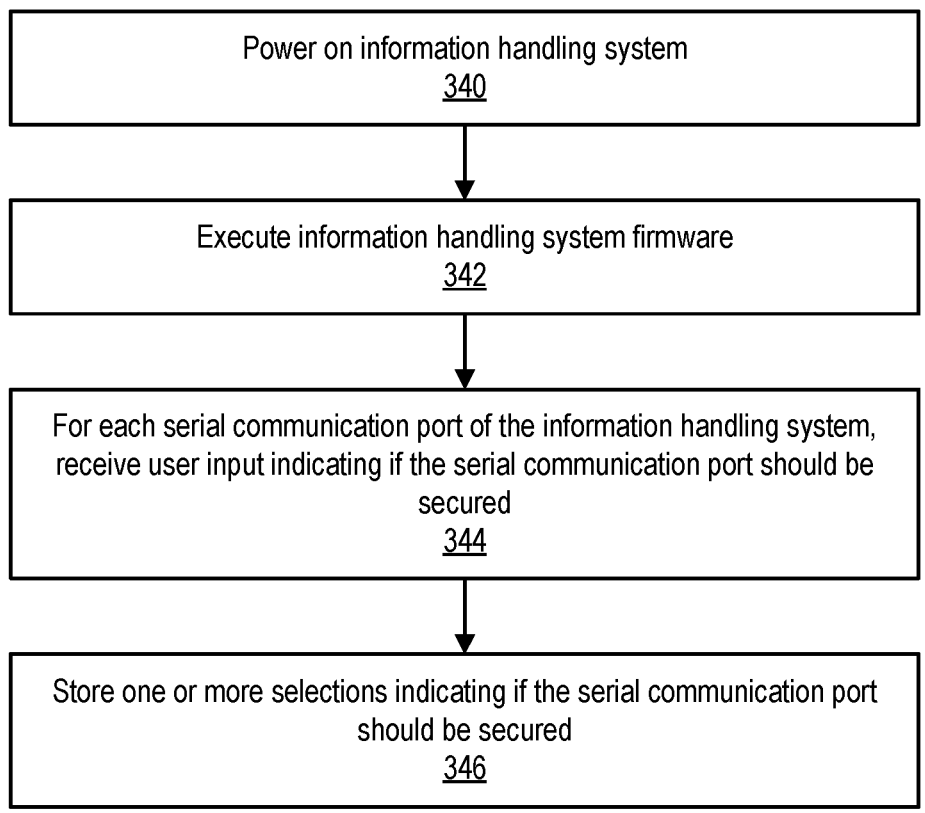
FIG. 3C illustrates an example of a method of configuring one or more serial ports of an information handling system, according to one or more embodiments.

Turning now to FIG. 3C, an example of a method of configuring one or more serial ports of an information handling system is illustrated, according to one or more embodiments. At 340, an information handling system may be powered on. For example, IHS 110 may be powered on. For instance, IHS 110 may power on in response to input indicating that IHS 110 should power on. At 342, information handling system firmware may be executed. For example, IHS 110 may execute IHSFW 172. For instance, processor 120 may execute IHSFW 172.

At 344, for each serial communication port of the information handling system, user input may be received indicating if the serial communication port should be secured. For example, for each serial communication port 132 of IHS 110, IHS 110 may receive user input indicating if serial communication port 132 should be secured. For instance, for each serial communication port 132 of IHS 110, IHSFW 172 may receive user input indicating if serial communication port 132 should be secured.

At 346, one or more selections indicating if the serial communication port should be secured may be stored. In one example, IHS 110 may store one or more selections indicating if the serial communication port should be secured. In one instance, IHS 110 may store, via a memory medium of IHS 110, one or more selections indicating if the serial communication port should be secured. In another instance, IHS 110 may store, via a memory medium of another information handling system, one or more selections indicating if the serial communication port should be secured. In another example, IHSFW 172 may store one or more selections indicating if the serial communication port should be secured. In one instance, IHSFW 172 may store, via a memory medium of IHS 110, one or more selections indicating if the serial communication port should be secured. In another instance, IHSFW 172 may store, via a memory medium of another information handling system, one or more selections indicating if the serial communication port should be secured.

Figure 4:
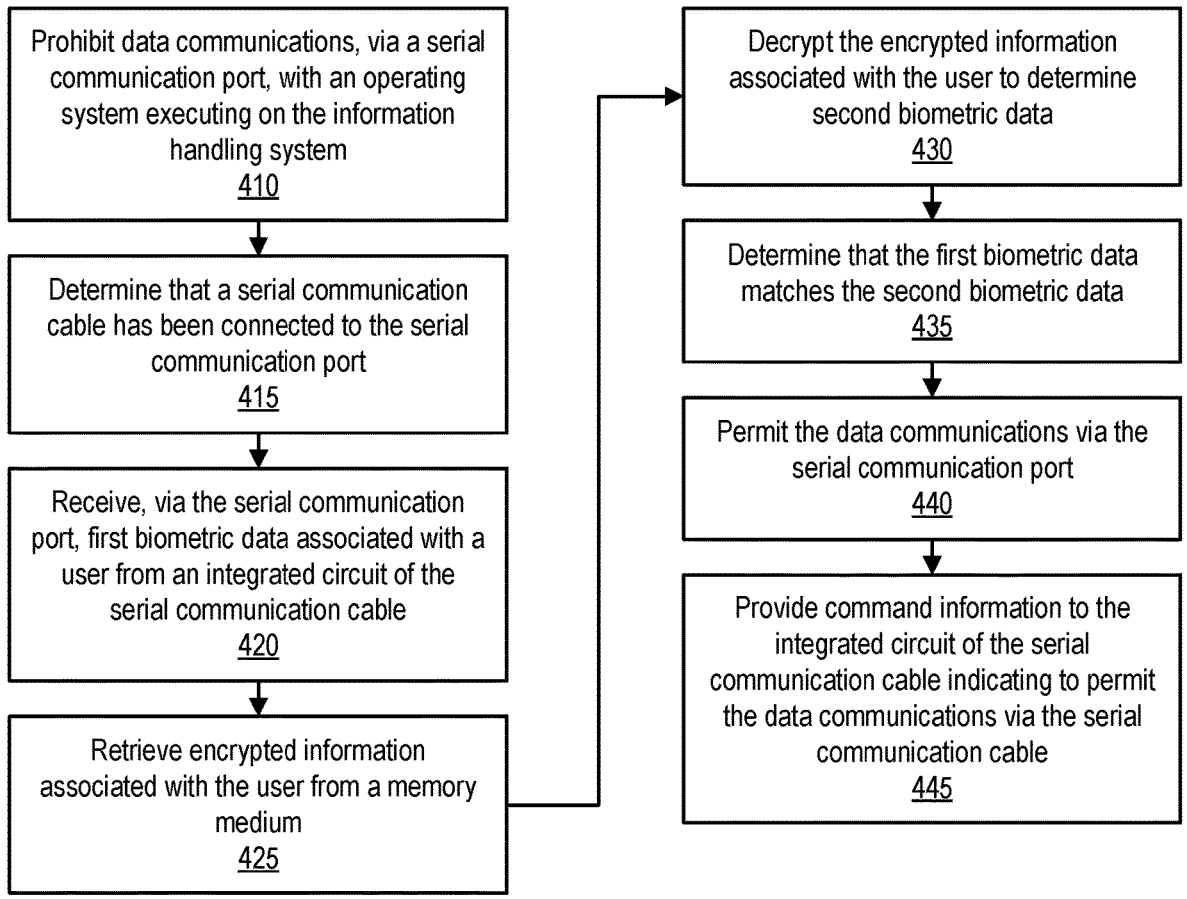
FIG. 4 illustrates another example of a method of providing access control of one or more serial ports of an information handling system, according to one or more embodiments.

Turning now to FIG. 4, another example of a method of providing access control of one or more serial ports of an information handling system is illustrated, according to one or more embodiments. At 410, data communications, via a serial communication port of an information handling system, with an operating system executing on the information handling system may be prohibited. For example, IHSFW 172 may prohibit data communications, via a serial communication port 132 of IHS 110, with OS 162 executing on IHS 110. In one or more embodiments, the serial communication port may be configured to be compliant with at least one of a USB specification, a Thunderbolt specification, a SATA specification, and a SAS specification, among others. For example, serial communication port 132 may be configured to be compliant with at least one of a USB specification, a Thunderbolt specification, a SATA specification, and a SAS specification, among others.

At 415, it may be determined that a serial communication cable has been connected to the serial communication port. For example, IHSFW 172 may determine that secure serial communication cable 210 has been connected to serial communication port 132. In one or more embodiments, determining that the serial communication cable has been connected to the serial communication port may include receiving a hot plug event that indicates that the serial communication cable has been connected to the serial communication port. For example, IHSFW 172 may determine that secure serial communication cable 210 has been connected to serial communication port 132 via a hot plug event.

In one or more embodiments, determining that the serial communication cable has been connected to the serial communication port may include determining that a serial device has been communicatively coupled to the information handling system via the serial communication cable and the serial communication port. For example, the serial device may include a serial peripheral device. For instance, the serial peripheral device may include one or more of a mouse, keyboard, an image scanner, a document scanner, a game controller, a barcode reader, a light pen, a microphone, a camera, a printer, a speaker, headphones, a display, a network adapter, a modem, a trackball, a smart phone, a terminal, and a nonvolatile memory medium (e.g., a thumb drive, a portable hard drive, etc.), among others.

In one or more embodiments, a hot plug event may indicate that a device is added or connected to an information handling system without shutting down an operating system executing on the information handling system or powering off the information handling system. For example, when a USB device is connected to the information handling system, the USB device may be quickly added a hierarchy of the information handling system. In one or more embodiments, a hot plug event may include a notification to one or more of information handling system firmware or an operating system. For example, the notification may indicate that a change has occurred in a configuration of the information handling system. For instance, the one or more of the information handling system firmware or the operating system may perform one or more actions in response to receiving the notification.

At 420, first biometric data associated with a user may be received, via the serial communication port, from an integrated circuit of the serial communication cable. For example, IHSFW 172 may receive, via serial communication port 132, first biometric data associated with user 232 from integrated circuit 270 of secure serial communication cable 210. In one or more embodiments, the first biometric data associated with the user may include first fingerprint data associated with the user. For example, IHSFW 172 may receive, via serial communication port 132, first fingerprint data associated with user 232 from integrated circuit 270 of secure serial communication cable 210. For instance, integrated circuit 270 may determine the first fingerprint data associated with user 232 via scanner 230.

In one or more embodiments, a fingerprint of the user may include patterns of friction ridges associated with a finger of the user. For example, the patterns of friction ridges associated with the finger of the user may be called the fingerprint. In one or more embodiments, a fingerprint may be uniquely detailed and durable a lifetime of the user and may be difficult to alter. For example, as there may be countless combinations, fingerprints have become an ideal way to identify the user. For instance, fingerprints have become a means of identification.

In one or more embodiments, scanner 230 may include an optical scanner. For example, the optical scanner may acquire a visual image of a fingerprint utilizing a digital camera. In one or more embodiments, scanner 230 may include a capacitive scanner. For example, the capacitive scanner may utilize capacitors and electrical current to form an image of a fingerprint. In one or more embodiments, scanner 230 may include an ultrasonic scanner. For example, the ultrasonic scanner may utilize ultrasonic frequency sound waves to penetrate an epidermal layer of skin to acquire a fingerprint. In one or more embodiments, scanner 230 may include a thermal scanner. For example, the thermal scanner may determine temperature differences on a contact surface and/or in between ridges and valleys of a fingerprint.

At 425, encrypted information associated with the user may be retrieved from a memory medium. For example, IHSFW 172 may retrieve encrypted information associated with user 232 from a memory medium. In one instance, IHSFW 172 may retrieve the encrypted information associated with user 232 from nonvolatile memory medium 160. In a second instance, IHSFW 172 may retrieve the encrypted information associated with user 232 from nonvolatile memory medium 170. In another instance, IHSFW 172 may retrieve the encrypted information associated with user 232 from a nonvolatile memory medium of another information handling system. As an example, IHSFW 172 may retrieve the encrypted information associated with user 232 from a nonvolatile memory medium of one of IHSs 110A-110N coupled to network 192. For instance, IHSFW 172 may retrieve the encrypted information associated with user 232 via network 192.

At 430, the encrypted information associated with the user may be decrypted to determine second biometric data. For example, IHSFW 172 may decrypt the encrypted information associated with user 232 to determine second biometric data. In one or more embodiments, the encrypted information associated with the user may be decrypted, using an encryption key, to determine second biometric data. For example, the encrypted information associated with the user may be decrypted, using a decryption process that uses the encryption key, to determine second biometric data. In one instance, the decryption process may include an asymmetric decryption process, which utilizes the encryption key, to determine the second biometric data. As an example, the encryption key may be or include a private encryption key. In another instance, the decryption process may include a symmetric decryption process, which utilizes the encryption key, to determine the second biometric data. As an example, the encryption key may be or include a symmetric encryption key.

At 435, it may be determined that the first biometric data matches the second biometric data. For example, IHSFW 172 may determine that the first biometric data matches the second biometric data. In one or more embodiments, the first biometric data may include first fingerprint data associated with the user, and the second biometric data may include second fingerprint data associated with the user. For example, the first fingerprint data may include a fingerprint template associated with the user, and the second fingerprint data may include multiple fingerprint features associated with a fingerprint of the user.

In one or more embodiments, determining that the first biometric data matches the second biometric data may include determining numerical match score based at least on the fingerprint template and the multiple fingerprint features and determining that the numerical match score meets or exceeds a numerical threshold. In one or more embodiments, the fingerprint template may include finger pattern skeletal data. For example, the finger pattern skeletal data may achieve interoperability between pattern and minutiae-based fingerprint recognition systems. For instance, the finger pattern skeletal data may be based at least on common properties shared between spectral pattern and minutia by encoding ridges in a manner that a skeleton of a ridge provides a basis for detecting a fingerprint minutia.

At 440, the data communications via the serial communication port may be permitted. For example, IHSFW 172 may permit the data communications via the serial communication port. In one or more embodiments, permitting the data communications via the serial communication port may be performed in response to determining that the first biometric data matches the second biometric data.

At 445, command information may be provided to the integrated circuit of the serial communication cable indicating to permit the data communications via the serial communication cable. For example, IHSFW 172 may provide command information to IC 270 of secure serial communication cable 210 indicating to permit the data communications via the serial communication cable. In one instance, IC 270 of secure serial communication cable 210 may couple conductors 282A and 282E or may permit conductors 282A and 282E to be coupled. In a second instance, IC 270 of secure serial communication cable 210 may couple conductors 282B and 282F or may permit conductors 282B and 282F to be coupled. In a third instance, IC 270 of secure serial communication cable 210 may couple conductors 282C and 282G or may permit conductors 282C and 282G to be coupled. In another instance, IC 270 of secure serial communication cable 210 may couple conductors 282D and 282H or may permit conductors 282D and 282H to be coupled. In one or more embodiments, providing command information to the integrated circuit of the serial communication cable indicating to permit the data communications via the serial communication cable may be performed in response to determining that the first biometric data matches the second biometric data.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:
1. An information handling system, comprising:
   at least one processor;

a serial communication port coupled to the at least one processor; and a memory medium, coupled to the at least one processor, that stores instructions executable by the at least one processor, which when executed by the at least one processor, cause the information handling system to:

prohibit data communications, via the serial communication port, with an operating system executing on the information handling system;

determine that a serial communication cable has been connected to the serial communication port;

receive, via the serial communication port, first biometric data associated with a user from an integrated circuit of the serial communication cable;

retrieve encrypted information associated with the user from a nonvolatile memory medium;

decrypt the encrypted information associated with the user to determine second biometric data;

determine that the first biometric data matches the second biometric data; and in response to determining that the first biometric data matches the second biometric data, permit the data communications via the serial communication port.

2. The information handling system of claim 1, wherein the instructions further cause the information handling system to, in response to determining that the first biometric data matches the second biometric data, provide command information to the integrated circuit of the serial communication cable indicating to permit the data communications via the serial communication cable.

3. The information handling system of claim 1, wherein, to determine that the serial communication cable has been connected to the serial communication port, the instructions further cause the information handling system to receive a hot plug event that indicates that the serial communication cable has been connected to the serial communication port.

4. The information handling system of claim 1, wherein the serial communication port is configured to be compliant with at least one of a universal serial bus (USB) specification, a Thunderbolt specification, a SATA (Serial Advanced Technology Attachment) specification, and a SAS (Serial Attached SCSI) specification.

5. The information handling system of claim 1,
wherein the first biometric data includes first fingerprint data associated with the user; and
wherein the second biometric data includes second fingerprint data associated with the user.

6. The information handling system of claim 5,
wherein the first fingerprint data includes a fingerprint template associated with the user; and
wherein the second fingerprint data includes a plurality of fingerprint features associated with a fingerprint of the user.

7. The information handling system of claim 6, wherein, to determine that the first biometric data matches the second biometric data, the instructions further cause the information handling system to:
determine numerical match score based at least on the fingerprint template and the plurality of fingerprint features; and
determine that the numerical match score meets or exceeds a numerical threshold.

8. A method, comprising:
prohibiting, by information handling system firmware executing on an information handling system, data communications, via a serial communication port of the information handling system, with an operating system executing on the information handling system;

determining, by the information handling system firmware, that a serial communication cable has been connected to the serial communication port;

receiving, by the information handling system firmware via the serial communication port, first biometric data associated with a user from an integrated circuit of the serial communication cable;

retrieving, by the information handling system firmware, encrypted information associated with the user from a nonvolatile memory medium;

decrypting, by the information handling system firmware, the encrypted information associated with the user to determine second biometric data;

determining, by the information handling system firmware, that the first biometric data matches the second biometric data; and in response to the determining that the first biometric data matches the second biometric data, permitting, by information handling system firmware, the data communications via the serial communication port.

9. The method of claim 8, further comprising:
in response to the determining that the first biometric data matches the second biometric data, providing, by information handling system firmware, command information to the integrated circuit of the serial communication cable indicating to permit the data communications via the serial communication cable.

10. The method of claim 8, wherein the determining that the serial communication cable has been connected to the serial communication port includes receiving a hot plug event that indicates that the serial communication cable has been connected to the serial communication port.

11. The method of claim 8, wherein the serial communication port is configured to be compliant with at least one of a universal serial bus (USB) specification, a Thunderbolt specification, a SATA (Serial Advanced Technology Attachment) specification, and a SAS (Serial Attached SCSI) specification.

12. The method of claim 8,
wherein the first biometric data includes first fingerprint data associated with the user; and
wherein the second biometric data includes second fingerprint data associated with the user.

13. The method of claim 12,
wherein the first fingerprint data includes a fingerprint template associated with the user; and
wherein the second fingerprint data includes a plurality of fingerprint features associated with a fingerprint of the user.

14. The method of claim 13, wherein the determining that the first biometric data matches the second biometric data includes:
determining numerical match score based at least on the fingerprint template and the plurality of fingerprint features; and
determining that the numerical match score meets or exceeds a numerical threshold.

15. A computer-readable non-transitory memory medium that includes instructions that, when executed by at least one processor of an information handling system, cause the information handling system to:
prohibit data communications, via a serial communication port of the information handling system, with an operating system executing on the information handling system;

determine that a serial communication cable has been connected to the serial communication port;

receive, via the serial communication port, first biometric data associated with a user from an integrated circuit of the serial communication cable;

retrieve encrypted information associated with the user from a nonvolatile memory medium;

decrypt the encrypted information associated with the user to determine second biometric data;

determine that the first biometric data matches the second biometric data; and in response to determining that the first biometric data matches the second biometric data, permit the data communications via the serial communication port.

16. The computer-readable non-transitory memory medium of claim 15, wherein the instructions further cause the information handling system to, in response to determining that the first biometric data matches the second biometric data, provide command information to the integrated circuit of the serial communication cable indicating to permit the data communications via the serial communication cable.

17. The computer-readable non-transitory memory medium of claim 15, wherein, to determine that the serial communication cable has been connected to the serial communication port, the instructions further cause the information handling system to receive a hot plug event that indicates that the serial communication cable has been connected to the serial communication port.

18. The computer-readable non-transitory memory medium of claim 15, wherein the serial communication port is configured to be compliant with at least one of a universal serial bus (USB) specification, a Thunderbolt specification, a SATA (Serial Advanced Technology Attachment) specification, and a SAS (Serial Attached SCSI) specification.

19. The computer-readable non-transitory memory medium of claim 15,
wherein the first biometric data includes first fingerprint data associated with the user; and
wherein the second biometric data includes second fingerprint data associated with the user.

20. The computer-readable non-transitory memory medium of claim 19,
wherein the first fingerprint data includes a fingerprint template associated with the user;
wherein the second fingerprint data includes a plurality of fingerprint features associated with a fingerprint of the user; and
wherein, to determine that the first biometric data matches the second biometric data, the instructions further cause the information handling system to:
determine numerical match score based at least on the fingerprint template and the plurality of fingerprint features; and
determine that the numerical match score meets or exceeds a numerical threshold.

* * * * *